(12) United States Patent
Smit et al.

(10) Patent No.: US 11,477,289 B2
(45) Date of Patent: Oct. 18, 2022

(54) SUPPORTING A ROUTING PROTOCOL WITH A TRANSPORT LAYER PROTOCOL

(71) Applicant: Nokia Solutions and Networks Oy, Espoo (FI)

(72) Inventors: Henk Smit, Berg en Dal (NL); Gunter Van de Velde, Lint (BE)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 16/154,919

(22) Filed: Oct. 9, 2018

(65) Prior Publication Data

US 2020/0112611 A1    Apr. 9, 2020

(51) Int. Cl.
*H04L 67/141* (2022.01)
*H04L 69/326* (2022.01)

(52) U.S. Cl.
CPC .......... *H04L 67/141* (2013.01); *H04L 69/326* (2013.01)

(58) Field of Classification Search
CPC ............................. H04L 67/141; H04L 69/326
USPC ........................................................ 709/227
See application file for complete search history.

(56) References Cited

U.S. PATENT DOCUMENTS

| | | | | |
|---|---|---|---|---|
| 5,920,705 A * | 7/1999 | Lyon | .................... | H04L 12/4608 370/409 |
| 7,796,537 B2 * | 9/2010 | White | ..................... | H04L 45/02 370/254 |
| 7,948,870 B1 * | 5/2011 | Rijsman | .................. | H04L 45/60 370/216 |
| 8,792,384 B2 * | 7/2014 | Banerjee | ................. | H04L 45/48 370/254 |
| 8,799,419 B1 * | 8/2014 | Lin | ..................... | G06F 9/45558 709/220 |

(Continued)

FOREIGN PATENT DOCUMENTS

EP    3567896 B1 *    9/2021    ......... H04L 12/4645

OTHER PUBLICATIONS

Merriam-Webster's Collegiate Dictionary 245 (10th ed. 1993) (Year: 1993).*

(Continued)

*Primary Examiner* — David P Zarka
(74) *Attorney, Agent, or Firm* — Tong, Rea, Bentley & Kim, LLC (57) ABSTRACT

Various example embodiments for supporting link-state flooding for a routing protocol based on use of a transport layer protocol are presented. Various example embodiments for supporting link-state flooding for a routing protocol based on use of a transport layer protocol may be configured to support use of routing protocol messages of the routing protocol to support establishment of transport layer connections of a transport layer protocol (e.g., use of adjacency messages of the routing protocol for identifying routers configured to support use of transport layer connections for supporting link-state flooding). Various example embodiments for supporting link-state flooding for a routing protocol based on use of a transport layer protocol may be configured to support use of transport layer connections to support communication of routing protocol messages of the routing protocol (e.g., adjacency messages, link-state messages for flooding of link-state information, or the like, as well as various combinations thereof).

16 Claims, 7 Drawing Sheets

(56) References Cited

U.S. PATENT DOCUMENTS

| | | | | |
|---|---|---|---|---|
| 8,817,782 | B2* | 8/2014 | Appalla | H04L 45/16 370/390 |
| 8,989,048 | B2* | 3/2015 | Qu | H04L 45/026 370/254 |
| 9,043,487 | B2* | 5/2015 | Retana | H04L 45/16 709/238 |
| 9,130,837 | B2* | 9/2015 | Bjarnason | H04L 41/0809 |
| 9,288,067 | B2* | 3/2016 | Farinacci | H04L 12/1836 |
| 10,015,053 | B2* | 7/2018 | Ashwood-Smith | H04L 45/245 |
| 10,404,810 | B2* | 9/2019 | Li | H04L 67/141 |
| 10,911,520 | B2* | 2/2021 | Plamondon | H04L 67/28 |
| 2004/0121792 | A1* | 6/2004 | Allen | H04L 45/00 455/519 |
| 2007/0206587 | A1* | 9/2007 | Ramaiah | H04L 45/02 370/389 |
| 2007/0237072 | A1* | 10/2007 | Scholl | H04L 12/66 370/222 |
| 2008/0002669 | A1* | 1/2008 | O'Brien | H04L 12/66 370/352 |
| 2008/0130500 | A1* | 6/2008 | Retana | H04L 12/66 370/235 |
| 2008/0247392 | A1* | 10/2008 | White | H04L 45/04 370/392 |
| 2008/0310433 | A1* | 12/2008 | Retana | H04L 45/02 370/401 |
| 2009/0059914 | A1* | 3/2009 | Khalid | H04L 12/2854 370/389 |
| 2010/0029275 | A1* | 2/2010 | Bosch | H04W 28/18 455/436 |
| 2010/0049868 | A1* | 2/2010 | Ginsberg | H04L 45/00 709/242 |
| 2011/0110370 | A1* | 5/2011 | Moreno | H04L 45/04 370/392 |
| 2012/0044940 | A1* | 2/2012 | Katz | H04L 12/462 370/400 |
| 2012/0075988 | A1* | 3/2012 | Lu | H04L 45/02 370/218 |
| 2015/0029948 | A1* | 1/2015 | Jayaraman | H04W 40/02 370/329 |
| 2016/0344652 | A1* | 11/2016 | Ashwood-Smith | H04L 41/12 |
| 2017/0366444 | A1* | 12/2017 | Ansari | H04L 45/02 |
| 2019/0116116 | A1* | 4/2019 | Przygienda | H04L 45/48 |

OTHER PUBLICATIONS

Kahn et al., Requirements for IPv6 Routers, Network Working Group, pp. 1-32, May 2018 (Year: 2018).*

Lapukhov, et al., "Use of BGP for Routing in Large-Scale Data Centers", Internet Engineering Task Force (IETF), RFC 7938, Aug. 2016, 35 pages.

Ford, et al. "TCP Extensions for Multipath Operation with Multiple Addresses," Internet Engineering Task Force (IETF), RFC 6824, Jan. 2013, 64 pages.

Callon, R.W., "Use of OSI IS-IS for Routing in TCP/IP and Dual Environments," Network Working Group, RFC 1195, Dec. 1990, 68 pages.

* cited by examiner

START 601 → 610 SUPPORT, BY A FIRST ROUTER VIA A COMMUNICATION LINK BETWEEN THE FIRST ROUTER AND A SECOND ROUTER, COMMUNICATION OF AN ADJACENCY MESSAGE OF A ROUTING PROTOCOL, WHEREIN THE ADJACENCY MESSAGE INCLUDES AN INDICATION AS TO WHETHER COMMUNICATION OF ROUTING PROTOCOL MESSAGES OF THE ROUTING PROTOCOL OVER A TRANSPORT LAYER CONNECTION IS SUPPORTED → END 699

START 701 → 710 SUPPORT ESTABLISHMENT OF A TRANSPORT LAYER CONNECTION OF A TRANSPORT LAYER PROTOCOL BETWEEN A FIRST ROUTER AND A SECOND ROUTER BASED ON A DETERMINATION THAT THE FIRST ROUTER AND THE SECOND ROUTER ARE EACH CONFIGURED TO SUPPORT COMMUNICATION OF ROUTING PROTOCOL MESSAGES OF A ROUTING PROTOCOL USING THE TRANSPORT LAYER PROTOCOL → END 799

START 801 → 810 SUPPORT, BY A FIRST ROUTER HAVING A ROUTING PROTOCOL ADJACENCY WITH A SECOND ROUTER BASED ON A ROUTING PROTOCOL, COMMUNICATION OF A ROUTING PROTOCOL MESSAGE OF THE ROUTING PROTOCOL VIA A TRANSPORT LAYER CONNECTION BETWEEN THE FIRST ROUTER AND THE SECOND ROUTER → END 899

FIG. 9

SUPPORTING A ROUTING PROTOCOL WITH A TRANSPORT LAYER PROTOCOL

TECHNICAL FIELD

Various example embodiments relate generally to communication networks and, more particularly but not exclusively, supporting routing protocols in communication networks.

BACKGROUND

Communication networks support communication of data via communication paths which may be controlled based on various routing protocols.

SUMMARY

In at least some example embodiments, an apparatus includes at least one processor and at least one memory including computer program code, wherein the at least one memory and the computer program code are configured to, with the at least one processor, cause the apparatus to at least support, by a first router via a communication link between the first router and a second router, communication of an adjacency message of a routing protocol, wherein the adjacency message includes an indication as to whether communication of routing protocol messages of the routing protocol over a transport layer connection is supported. In at least some example embodiments, to support communication of the adjacency message, the at least one memory and the computer program code are configured to, with the at least one processor, cause the apparatus to at least send, by the first router toward the second router, the adjacency message, wherein the adjacency message includes an indication as to whether the first router supports communication of routing protocol messages of the routing protocol over a transport layer connection. In at least some example embodiments, to support communication of the adjacency message, the at least one memory and the computer program code are configured to, with the at least one processor, cause the apparatus to at least receive, by the first router from the second router, the adjacency message, wherein the adjacency message includes an indication as to whether the second router supports communication of routing protocol messages of the routing protocol over a transport layer connection. In at least some example embodiments, the adjacency message further includes transport layer connection establishment information configured for use in establishing a transport layer connection between the first router and the second router. In at least some example embodiments, the transport layer connection establishment information includes an Internet Protocol (IP) address and a port number of a port on which the transport layer connection is to be established. In at least some example embodiments, the indication as to whether communication of routing protocol messages of the routing protocol over a transport layer connection is supported is provided using a type-length-value (TLV) in the adjacency message. In at least some example embodiments, the TLV further includes transport layer connection establishment information configured for use in establishing a transport layer connection between the first router and the second router. In at least some example embodiments, the indication as to whether communication of routing protocol messages of the routing protocol over a transport layer connection is supported is provided using tailored information injected into the adjacency message. In at least some example embodiments, the tailored information further includes transport layer connection establishment information configured for use in establishing a transport layer connection between the first router and the second router. In at least some example embodiments, the routing protocol includes Intermediate-System-to-Intermediate-System (IS-IS) or Open Shortest Path First (OSPF). In at least some example embodiments, the transport layer protocol includes Transmission Control Protocol (TCP), Multipath TCP, or Stream Control Transmission Protocol (SCTP).

In at least some example embodiments, a non-transitory computer-readable medium includes instructions configured to cause an apparatus to at least support, by a first router via a communication link between the first router and a second router, communication of an adjacency message of a routing protocol, wherein the adjacency message includes an indication as to whether communication of routing protocol messages of the routing protocol over a transport layer connection is supported. In at least some example embodiments, to support communication of the adjacency message, the non-transitory computer-readable medium includes instructions configured to cause the apparatus to at least send, by the first router toward the second router, the adjacency message, wherein the adjacency message includes an indication as to whether the first router supports communication of routing protocol messages of the routing protocol over a transport layer connection. In at least some example embodiments, to support communication of the adjacency message, the non-transitory computer-readable medium includes instructions configured to cause the apparatus to at least receive, by the first router from the second router, the adjacency message, wherein the adjacency message includes an indication as to whether the second router supports communication of routing protocol messages of the routing protocol over a transport layer connection. In at least some example embodiments, the adjacency message further includes transport layer connection establishment information configured for use in establishing a transport layer connection between the first router and the second router. In at least some example embodiments, the transport layer connection establishment information includes an Internet Protocol (IP) address and a port number of a port on which the transport layer connection is to be established. In at least some example embodiments, the indication as to whether communication of routing protocol messages of the routing protocol over a transport layer connection is supported is provided using a type-length-value (TLV) in the adjacency message. In at least some example embodiments, the TLV further includes transport layer connection establishment information configured for use in establishing a transport layer connection between the first router and the second router. In at least some example embodiments, the indication as to whether communication of routing protocol messages of the routing protocol over a transport layer connection is supported is provided using tailored information injected into the adjacency message. In at least some example embodiments, the tailored information further includes transport layer connection establishment information configured for use in establishing a transport layer connection between the first router and the second router. In at least some example embodiments, the routing protocol includes Intermediate-System-to-Intermediate-System (IS-IS) or Open Shortest Path First (OSPF). In at least some example embodiments, the transport layer protocol includes Transmission Control Protocol (TCP), Multipath TCP, or Stream Control Transmission Protocol (SCTP).

In at least some example embodiments, a method includes supporting, by a first router via a communication link between the first router and a second router, communication of an adjacency message of a routing protocol, wherein the adjacency message includes an indication as to whether communication of routing protocol messages of the routing protocol over a transport layer connection is supported. In at least some example embodiments, supporting communication of the adjacency message includes sending, by the first router toward the second router, the adjacency message, wherein the adjacency message includes an indication as to whether the first router supports communication of routing protocol messages of the routing protocol over a transport layer connection. In at least some example embodiments, supporting communication of the adjacency message includes receiving, by the first router from the second router, the adjacency message, wherein the adjacency message includes an indication as to whether the second router supports communication of routing protocol messages of the routing protocol over a transport layer connection. In at least some example embodiments, the adjacency message further includes transport layer connection establishment information configured for use in establishing a transport layer connection between the first router and the second router. In at least some example embodiments, the transport layer connection establishment information includes an Internet Protocol (IP) address and a port number of a port on which the transport layer connection is to be established. In at least some example embodiments, the indication as to whether communication of routing protocol messages of the routing protocol over a transport layer connection is supported is provided using a type-length-value (TLV) in the adjacency message. In at least some example embodiments, the TLV further includes transport layer connection establishment information configured for use in establishing a transport layer connection between the first router and the second router. In at least some example embodiments, the indication as to whether communication of routing protocol messages of the routing protocol over a transport layer connection is supported is provided using tailored information injected into the adjacency message. In at least some example embodiments, the tailored information further includes transport layer connection establishment information configured for use in establishing a transport layer connection between the first router and the second router. In at least some example embodiments, the routing protocol includes Intermediate-System-to-Intermediate-System (IS-IS) or Open Shortest Path First (OSPF). In at least some example embodiments, the transport layer protocol includes Transmission Control Protocol (TCP), Multipath TCP, or Stream Control Transmission Protocol (SCTP).

In at least some example embodiments, an apparatus includes means for supporting, by a first router via a communication link between the first router and a second router, communication of an adjacency message of a routing protocol, wherein the adjacency message includes an indication as to whether communication of routing protocol messages of the routing protocol over a transport layer connection is supported. In at least some example embodiments, the means for supporting communication of the adjacency message includes means for sending, by the first router toward the second router, the adjacency message, wherein the adjacency message includes an indication as to whether the first router supports communication of routing protocol messages of the routing protocol over a transport layer connection. In at least some example embodiments, the means for supporting communication of the adjacency message includes means for receiving, by the first router from the second router, the adjacency message, wherein the adjacency message includes an indication as to whether the second router supports communication of routing protocol messages of the routing protocol over a transport layer connection. In at least some example embodiments, the adjacency message further includes transport layer connection establishment information configured for use in establishing a transport layer connection between the first router and the second router. In at least some example embodiments, the transport layer connection establishment information includes an Internet Protocol (IP) address and a port number of a port on which the transport layer connection is to be established. In at least some example embodiments, the indication as to whether communication of routing protocol messages of the routing protocol over a transport layer connection is supported is provided using a type-length-value (TLV) in the adjacency message. In at least some example embodiments, the TLV further includes transport layer connection establishment information configured for use in establishing a transport layer connection between the first router and the second router. In at least some example embodiments, the indication as to whether communication of routing protocol messages of the routing protocol over a transport layer connection is supported is provided using tailored information injected into the adjacency message. In at least some example embodiments, the tailored information further includes transport layer connection establishment information configured for use in establishing a transport layer connection between the first router and the second router. In at least some example embodiments, the routing protocol includes Intermediate-System-to-Intermediate-System (IS-IS) or Open Shortest Path First (OSPF). In at least some example embodiments, the transport layer protocol includes Transmission Control Protocol (TCP), Multipath TCP, or Stream Control Transmission Protocol (SCTP).

In at least some example embodiments, an apparatus includes at least one processor and at least one memory including computer program code, wherein the at least one memory and the computer program code are configured to, with the at least one processor, cause the apparatus to at least support, by a first router having a routing protocol adjacency with a second router based on a routing protocol, communication of a routing protocol message of the routing protocol via a transport layer connection between the first router and the second router. In at least some example embodiments, to support communication of the routing protocol message, the at least one memory and the computer program code are configured to, with the at least one processor, cause the apparatus to at least send, by the first router toward the second router via the transport layer connection, the routing protocol message. In at least some example embodiments, to support communication of the routing protocol message, the at least one memory and the computer program code are configured to, with the at least one processor, cause the apparatus to at least receive, by the first router from the second router via the transport layer connection, the routing protocol message. In at least some example embodiments, the routing protocol message includes a router adjacency message. In at least some example embodiments, the router adjacency message is configured for enabling verification and authentication between the first router and the second router. In at least some example embodiments, the routing protocol message includes a link-state message. In at least some example embodiments, the link-state message is configured to enable flooding of link-state information. In at least some example embodiments, the routing protocol includes Intermediate-System-to-Intermediate-System (IS-IS) or Open Shortest Path First (OSPF). In at least some example embodiments, the transport layer protocol includes Transmission Control Protocol (TCP), Multipath TCP, or Stream Control Transmission Protocol (SCTP).

In at least some example embodiments, a non-transitory computer-readable medium includes instructions configured to cause an apparatus to at least support, by a first router having a routing protocol adjacency with a second router based on a routing protocol, communication of a routing protocol message of the routing protocol via a transport layer connection between the first router and the second router. In at least some example embodiments, to support communication of the routing protocol message, the non-transitory computer-readable medium includes instructions configured to cause the apparatus to at least send, by the first router toward the second router via the transport layer connection, the routing protocol message. In at least some example embodiments, to support communication of the routing protocol message, the non-transitory computer-readable medium includes instructions configured to cause the apparatus to at least receive, by the first router from the second router via the transport layer connection, the routing protocol message. In at least some example embodiments, the routing protocol message includes a router adjacency message. In at least some example embodiments, the router adjacency message is configured for enabling verification and authentication between the first router and the second router. In at least some example embodiments, the routing protocol message includes a link-state message. In at least some example embodiments, the link-state message is configured to enable flooding of link-state information. In at least some example embodiments, the routing protocol includes Intermediate-System-to-Intermediate-System (IS-IS) or Open Shortest Path First (OSPF). In at least some example embodiments, the transport layer protocol includes Transmission Control Protocol (TCP), Multipath TCP, or Stream Control Transmission Protocol (SCTP).

In at least some example embodiments, a method includes supporting, by a first router having a routing protocol adjacency with a second router based on a routing protocol, communication of a routing protocol message of the routing protocol via a transport layer connection between the first router and the second router. In at least some example embodiments, supporting communication of the routing protocol message includes sending, by the first router toward the second router via the transport layer connection, the routing protocol message. In at least some example embodiments, supporting communication of the routing protocol message includes receiving, by the first router from the second router via the transport layer connection, the routing protocol message. In at least some example embodiments, the routing protocol message includes a router adjacency message. In at least some example embodiments, the router adjacency message is configured for enabling verification and authentication between the first router and the second router. In at least some example embodiments, the routing protocol message includes a link-state message. In at least some example embodiments, the link-state message is configured to enable flooding of link-state information. In at least some example embodiments, the routing protocol includes Intermediate-System-to-Intermediate-System (IS-IS) or Open Shortest Path First (OSPF). In at least some example embodiments, the transport layer protocol includes Transmission Control Protocol (TCP), Multipath TCP, or Stream Control Transmission Protocol (SCTP).

In at least some example embodiments, an apparatus includes means for supporting, by a first router having a routing protocol adjacency with a second router based on a routing protocol, communication of a routing protocol message of the routing protocol via a transport layer connection between the first router and the second router. In at least some example embodiments, the means for supporting communication of the routing protocol message includes means for sending, by the first router toward the second router via the transport layer connection, the routing protocol message. In at least some example embodiments, the means for supporting communication of the routing protocol message includes means for receiving, by the first router from the second router via the transport layer connection, the routing protocol message. In at least some example embodiments, the routing protocol message includes a router adjacency message. In at least some example embodiments, the router adjacency message is configured for enabling verification and authentication between the first router and the second router. In at least some example embodiments, the routing protocol message includes a link-state message. In at least some example embodiments, the link-state message is configured to enable flooding of link-state information. In at least some example embodiments, the routing protocol includes Intermediate-System-to-Intermediate-System (IS-IS) or Open Shortest Path First (OSPF). In at least some example embodiments, the transport layer protocol includes Transmission Control Protocol (TCP), Multipath TCP, or Stream Control Transmission Protocol (SCTP).

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements that are common to the figures.

DETAILED DESCRIPTION

Various example embodiments for supporting a routing protocol are presented. Various example embodiments for supporting link-state flooding for a routing protocol are presented. Various example embodiments for supporting link-state flooding for a routing protocol may be configured to support link-state flooding for the routing protocol based on use of a transport layer protocol. Various example embodiments for supporting link-state flooding for a routing protocol may be configured to support link-state flooding for the routing protocol based on use of transport layer connections of a transport layer protocol. Various example embodiments for supporting link-state flooding for a routing protocol based on use of transport layer connections of a transport layer protocol may be configured to support use of routing protocol messages of the routing protocol to support establishment of transport layer connections of a transport layer protocol (e.g., use of adjacency messages of the routing protocol for identifying routers configured to support use of transport layer connections of a transport layer protocol for supporting link-state flooding). Various example embodiments for supporting link-state flooding for a routing protocol based on use of transport layer connections of a transport layer protocol may be configured to support use of transport layer connections of a transport layer protocol to support communication of routing protocol messages of the routing protocol (e.g., adjacency messages, link-state messages for flooding of link-state information, or the like, as well as various combinations thereof). Various example embodiments for supporting link-state flooding for a routing protocol based on use of a transport layer protocol may be configured to support use of a reliable transport layer protocol (e.g., Transmission Control Protocol (TCP), Multipath TCP (e.g., as defined in RFC 6824), Stream Control Transmission Protocol (SCTP), or the like, as well as various combinations thereof). It will be appreciated that these and various other example embodiments and advantages of supporting link-state flooding for a routing protocol may be further understood by way of reference to the various figures, which are discussed further below.

Figure 1:
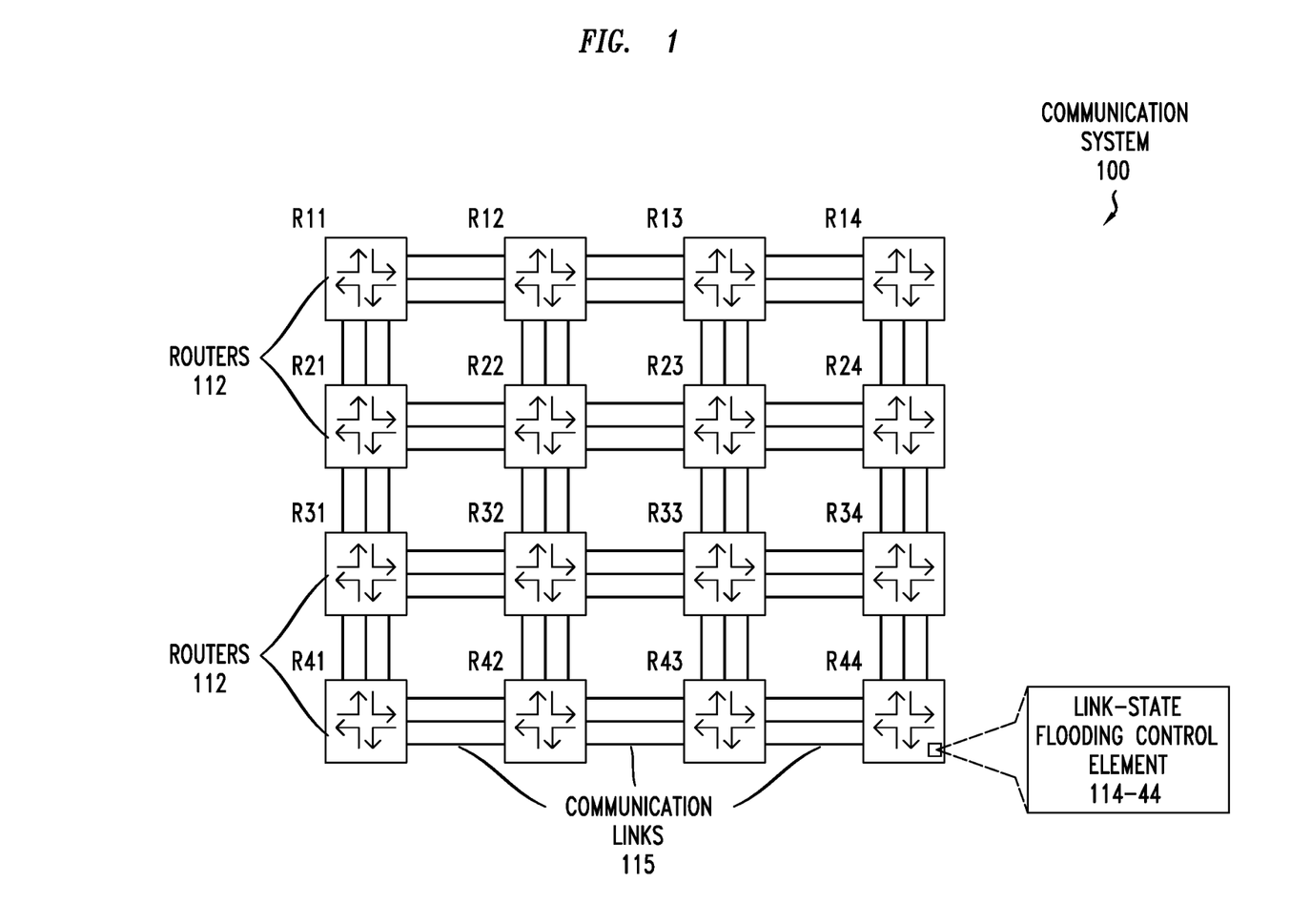
FIG. 1 depicts an example embodiment of a communication system including routers configured to support link-state flooding for a routing protocol based on use of transport layer connections of a transport layer protocol.

FIG. 1 depicts an example embodiment of a communication system including routers configured to support link-state flooding for a routing protocol based on use of transport layer connections of a transport layer protocol.

The communication system 100 includes a set of routers 112 and a set of communication links 115 configured to connect the routers 112 for supporting communications between the routers 112. As illustrated in FIG. 1, the set of routers 112 includes sixteen routers 112 which are arranged in a four-by-four grid (and which, for purposes of clarity, also are numbered using the convention Rxy, where x (1 . . . 4 denotes the row of the grid and y (1 . . . 4 denotes the column of the grid). As illustrated in FIG. 1, each router 112 is connected to each of its neighboring routers 112 via a communication link 115, respectively. It will be appreciated that, although primarily presented with respect to a communication system having specific types, numbers, and arrangements of elements (e.g., routers 112 and communication links 115), the communication system may include various other types, numbers, and arrangements of elements.

The communication system 100 is configured to support link-state flooding for a routing protocol. The routers 112 may be configured to support link-state flooding for a routing protocol based on exchanging of routing protocol messages (e.g., adjacency messages for adjacency establishment, link-state messages for flooding of link-state information, or the like) of the routing protocol between routers 112. The routers 112 may be configured to support establishment of adjacencies between neighboring routers 112 for use in exchanging link-state information of the routing protocol with adjacent routers 112. The routers 112 may be configured to maintain and exchange link-state information of the routing protocol with adjacent routers 112. The link-state information that is maintained and flooded by the routers 112 may be maintained using link state databases (LSDBs) on the routers 112 (which have been omitted for purposes of clarity). The routing protocol for which link-state flooding is supported may be any routing protocol which may be used to flood link-state information, such as an Interior Gateway Protocol (e.g., Intermediate-System-to-Intermediate-System (IS-IS), Open Shortest Path First (OSPF), or the like), an Exterior Gateway Protocol, or the like. The adjacency messages that are exchanged for establishment of adjacencies between routers 112 may vary across various routing protocols (e.g., IS-IS Hello messages, OSPF Hello messages, or the like). The link-state messages that are exchanged for flooding of link-state information may vary across various routing protocols (e.g., link state packets (LSPs) in IS-IS, link state advertisements (LSAs) in OSPF, or the like). It will be appreciated that, although primarily presented with respect to use of a single routing protocol, multiple routing protocols may be active within the communication system 100.

The communication system 100 is configured to support link-state flooding for a routing protocol based on use of a transport layer protocol. The routers 112 may be configured to support link-state flooding for a routing protocol based on use of transport layer connections of a transport layer protocol for communication of routing protocol messages (e.g., adjacency messages for adjacency establishment, link-state messages for flooding of link-state information, or the like) of the routing protocol between routers 112. The transport layer protocol may be a reliable transport layer protocol, such as TCP, Multipath TCP, SCTP, or the like; however, for purpose of clarity, various embodiments are primarily presented herein within the context of use of TCP as the transport layer protocol used to support link-state flooding of the routing protocol (in which case, it will be understood, the associated transport layer connections may be TCP connections). The use of a reliable transport layer protocol for link-state flooding may provide various advantages over simply using the routing protocol for link-state flooding, since a reliable transport layer protocol is able to supply reliability through various reliability mechanisms (e.g., acknowledgments, retransmissions, windowing, multi-threading, or the like, as well as various combinations thereof) which may vary across different transport layer protocols. For example, use of TCP for link-state flooding may provide various advantages over simply using the routing protocol for link-state flooding, since TCP supplies reliability through acknowledgments and retransmissions, supplies high throughput through its windowing mechanism and by potentially packing small chunks of user-data into larger TCP segments, supplies a crude form of multi-threading by separating transmission and retransmission of data from the user process, and so forth. As such, when a routing protocol uses a reliable transport layer protocol for link-state flooding, the routing protocol no longer needs to burden itself with various reliability tasks which would otherwise be handled by the routing protocol (e.g., acknowledgments, retransmissions, windowing, multi-threading, and so forth); although it will be appreciated that at least some such reliability tasks could continue to be performed by the routing protocol.

The communication system 100, as indicated above, is configured to support link-state flooding for a routing protocol based on use of transport layer connections of a transport layer protocol. The routers 112 each include a link-state flooding control element 114, respectively, configured to support various functions supporting link-state flooding for a routing protocol based on use of transport layer connections of a transport layer protocol (although it is noted that, for purposes of clarity, only one of the link-state flooding control elements 114, associated with router R44 and numbered as link-state flooding control element 114-44, is illustrated in FIG. 1). For example, the link-state flooding control elements 114 may be configured to support use of routing protocol messages of the routing protocol to support establishment of transport layer connections of a transport layer protocol (e.g., use of adjacency messages of the routing protocol for identifying routers 112 configured to support use of transport layer connections of a transport layer protocol for supporting link-state flooding), at least some embodiments of which are presented with respect to FIG. 2 and FIG. 3. For example, the link-state flooding control elements 114 may be configured to support link-state flooding for a routing protocol based on use of transport layer connections of a transport layer protocol to support communication of routing protocol messages of the routing protocol (e.g., adjacency messages, link-state messages for flooding of link-state information, or the like, as well as various combinations thereof), at least some embodiments of which are presented with respect to FIG. 4 and FIG. 5. It is noted that the link-state flooding control elements 114 of the routers 112 may be configured to support various other functions for supporting link-state flooding for a routing protocol based on use of transport layer connections of a transport layer protocol.

Figure 2:
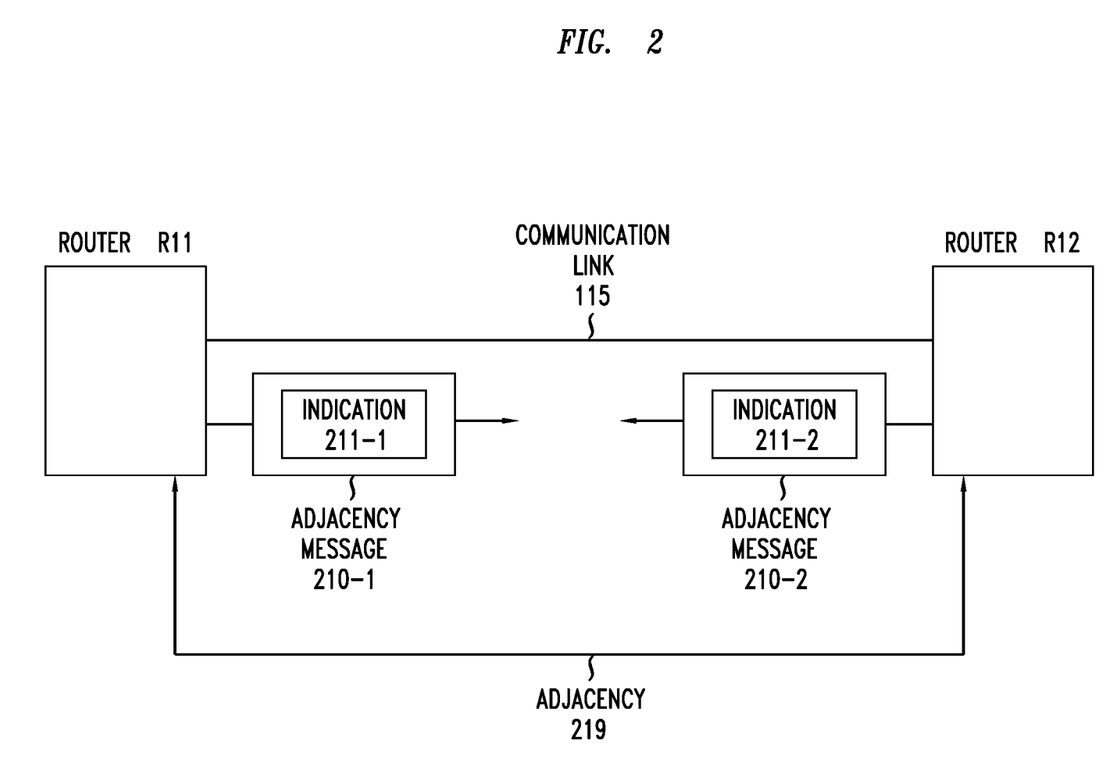
FIG. 2 depicts a pair of routers of the communication system of FIG. 1, in which the routers establish an adjacency in a manner for learning whether the routers are configured to support use of a transport layer connection for supporting communication of routing protocol messages between the routers.

FIG. 2 depicts a pair of routers of the communication system of FIG. 1, in which the routers establish an adjacency in a manner for learning whether the routers are configured to support use of a transport layer connection for supporting communication of routing protocol messages between the routers. As depicted in FIG. 2, routers R11 and R12 are connected by a communication link.

The routers R11 and R12 are configured to support establishment of an adjacency therebetween for a routing protocol to be used for flooding of link-state information between routers R11 and R12. The routers R11 and R12 may establish the adjacency for the routing protocol based on exchanging of adjacency messages 210 of the routing protocol. As depicted in FIG. 2, router R11 may send an adjacency message 210-1 to the router R12 via the communication link and, similarly, the router R12 may send an adjacency message 210-2 to the router R12 via the communication link. For example, the adjacency messages 210 may be IS-IS Hello messages, OSPF Hello messages, or the like. The adjacency that is established between routers R11 and R12 based on the exchanging of the adjacency messages 210 is indicated as adjacency 219 in FIG. 2. It will be appreciated that the adjacency 219 that is established may operate in accordance with the routing protocol (e.g., the neighbor adjacency management and liveliness of the underlying routing protocol may continue).

The routers R11 and R12 are configured to establish the adjacency therebetween in a manner for learning whether the routers R11 and R12 are both configured to support use of a transport layer connection for supporting communication of routing protocol messages between the routers R11 and R12. The routers R11 and R12 may learn whether the routers R11 and R12 are both configured to support use of a transport layer connection for supporting communication of routing protocol messages between the routers R11 and R12 based on inclusion of indications 211 in the adjacency messages 210, respectively.

As depicted in FIG. 2, router R11 may send the adjacency message 210-1 to the router R12 where the adjacency message 210-1 includes an indication 211-1 as to whether the router R11 supports use of a transport layer connection for supporting communication of routing protocol messages and, similarly, the router R12 may send the adjacency message 210-2 to the router R11 where the adjacency message 210-2 includes an indication 211-2 as to whether the router R12 supports use of a transport layer connection for supporting communication of routing protocol messages. The indications 211, in addition to providing indications as to whether the respective routers R11 and R12 support use of a transport layer connection for supporting communication of routing protocol messages, also may include transport layer connection establishment information (e.g., IP address information, transport layer port number information, or the like, as well as various combinations thereof) for use by the routers R11 and R12 in establishing a transport layer connection between the routers R11 and R12. It will be appreciated that, although primarily presented with respect to embodiments in which the transport layer connection establishment information is included within the indications 211, in at least some embodiments at least a portion of the transport layer connection establishment information may be included within the adjacency messages 210 without being included in the indications 211 of the adjacency messages 211.

The indications 211 as to whether the routers R11 and R12 support use of a transport layer connection for supporting communication of routing protocol messages may be provided in various ways. The indications 211 may be provided using tailored information injected into the adjacency messages 210, respectively (in which case the tailored information may further include transport layer connection establishment information configured for use in establishing a transport layer connection between routers R11 and R12). The indications 211 may include various indicator types (e.g., using one or more existing TLVs or sub-TLVs, one or more new TLVs or sub-TLVs, one or more existing fields, one or more new fields, one or more values, or the like, as well as various combinations thereof). In at least some embodiments, in which the indications 211 are TLVs, presence of the TLV within the adjacency message 210-x indicates that the router Rxy that sent the adjacency message 210-x supports use of a transport layer connection for supporting communication of routing protocol messages and, further, the TLV may include at least a portion of the transport layer connection establishment information for use by the router Ryx that receives the adjacency message 210-x in supporting establishment of a transport layer connection between the router Rxy that sent the adjacency message 210-x and the router Ryx that received the adjacency message 210-x (assuming that both routers Rxy and Ryx are determined to support use of a transport layer connection for supporting communication of routing protocol messages).

In embodiments in which the routing protocol is IS-IS and the transport layer protocol is TCP, for example, presence of an LSP-over-TCP Flooding TLV within an IS-IS Hello message sent from router Rxy to router Ryx indicates to router Ryx that the router Rxy supports use of a TCP connection for supporting communication of IS-IS messages (e.g., IS-IS Hello messages, IS-IS LSPs, or the like). In at least some such embodiments, the TCP connection establishment information may be obtained by the router Ryx from the LSP-over-TCP Flooding TLV within the IS-IS Hello message sent from router Rxy to router Ryx (e.g., the TCP port number of the router Rxy may be included within the LSP-over-TCP Flooding TLV by the router Rxy), obtained by the router Ryx from the IS-IS Hello TLV of the IS-IS Hello message (e.g., the IP address of the router Rxy may be harvested from the IS-IS Hello TLV of the IS-IS Hello message (e.g., TLV type 132 in RFC 1195)), or the like, as well as various combinations thereof.

In embodiments in which the routing protocol is OSPF and the transport layer protocol is TCP, for example, presence of an LSA-over-TCP Flooding indication (e.g., a field, a value, a TLV, or the like) within an OSPF message (e.g., an OSPF Hello message or other type of OSPF message) sent from router Rxy to router Ryx indicates to router Ryx that the router Rxy supports use of a TCP connection for supporting communication of OSPF messages (e.g., OSPF Hello messages, OSPF LSAs, OSPF Opaque LSAs, or the like). In at least some such embodiments, the TCP connection establishment information may be obtained by the router Ryx from the LSA-over-TCP Flooding indication within the OSPF Hello message sent from router Rxy to router Ryx (e.g., the TCP port number of the router Rxy may be included within or otherwise associated with the LSA-over-TCP Flooding indication by the router Rxy), obtained by the router Ryx from the OSPF message that includes the LSA-over-TCP Flooding indication (e.g., the IP address of the router Rxy may be harvested from the OSPF message that includes the LSA-over-TCP Flooding indication), or the like, as well as various combinations thereof.

The routers R11 and R12, based on their respective local information (i.e., each router R11 and R12 knows whether it supports use of a transport layer connection for supporting communication of routing protocol messages) and the respective remote information received from each other (i.e., the indications 211 in the adjacency messages 210), are able to determine whether or not a transport layer connection of a transport layer protocol should be used to support communication of routing protocol messages between routers R11 and R12 (and, if a transport layer connection should be used to support communication of routing protocol messages between routers R11 and R12, transport layer connection establishment information for use in establishing a transport layer connection between routers R11 and R12). In this example, it is assumed that both R11 and R12 support use of a transport layer protocol for communication of routing protocol messages and, thus, that a transport layer connection is established between router R11 and router R12 (e.g., as presented with respect to FIG. 3).

Figure 3:
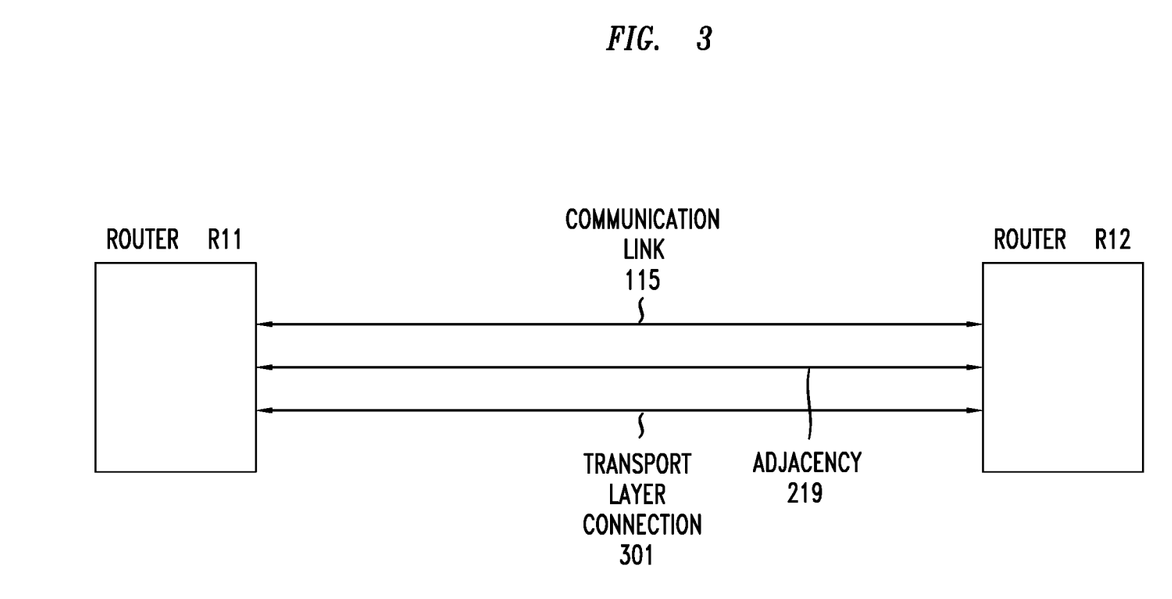
FIG. 3 depicts the pair of routers of FIG. 2, in which the routers establish a transport layer connection configured for use in supporting communication of routing protocol messages between the routers.

FIG. 3 depicts the pair of routers of FIG. 2, in which the routers establish a transport layer connection configured for use in supporting communication of routing protocol messages between the routers.

The routers R11 and R12 are configured to support establishment of a transport layer connection therebetween for supporting communication of routing protocol messages of a routing protocol to be used for flooding of link-state information between routers R11 and R12. The transport layer connection may be a TCP connection or other suitable type of transport layer connection based on a transport layer protocol.

The routers R11 and R12 may initiate establishment the transport layer connection based on a determination that routers R11 and R12 are both configured to support use of the transport layer connection for supporting communication of routing protocol messages of the routing protocol. The establishment of the transport layer connection between the routers R11 and R12 may be initiated by router R11 or router R12.

The routers R11 and R12 may support mechanisms for independently determining which router, router R11 or router R12, will initiate establishment of the transport layer connection. In at least some embodiments, for example, the routers R11 and R12 may use a tie-breaking mechanism for determining which router, router R11 or router R12, will initiate establishment of the transport layer connection. The tie-breaking mechanism may be based on information available to routers R11 and R12, such as router identifier (e.g., the router with the higher or lower router-id initiates the transport layer connection), IP address (e.g., the router with the higher or lower IP address initiates the transport layer connection), or the like.

The routers R11 and R12, as indicated above, support establishment of a transport layer connection therebetween. The transport layer connection that is established between routers R11 and R12 is indicated as transport layer connection 301 in FIG. 3. The routers R11 and R12 may then utilize the transport layer connection 301 for communication of routing protocol messages between router R11 and router R12, including communication of adjacency messages (e.g., as presented with respect to FIG. 4) and communication of link-state messages (e.g., as presented with respect to FIG. 5).

Figure 4:
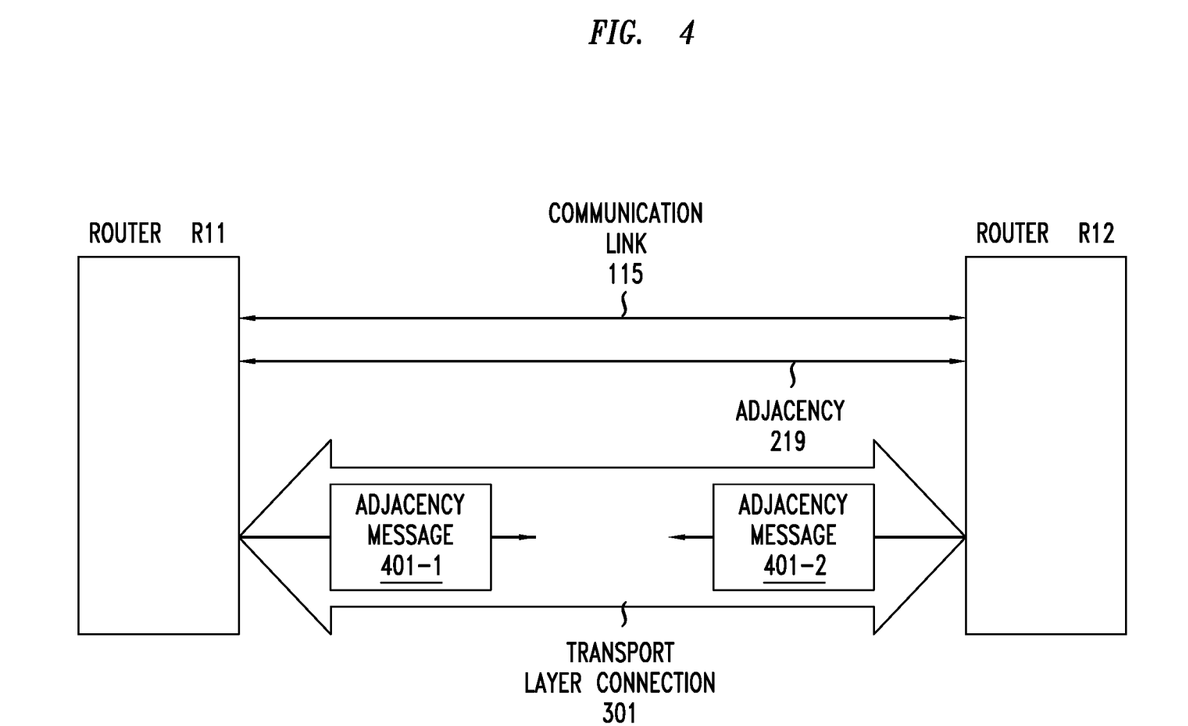
FIG. 4 depicts the pair of routers of FIG. 3, in which the routers use the transport layer connection to support communication of adjacency messages between the routers.

FIG. 4 depicts the pair of routers of FIG. 3, in which the routers use the transport layer connection to support communication of adjacency messages between the routers.

The routers R11 and R12 are configured to support communication of adjacency messages 401 of the routing protocol via the transport layer connection 301 between router R11 and router R12. For example, the adjacency messages 401 may be IS-IS Hello messages, OSPF Hello messages, or the like. The exchanging of adjacency messages 401 over the transport layer connection 301 enables each of the routers R11 and R12 to verify the identity and authentication of the remote router (i.e., R12 can verify the identity and authentication of router R11 based on an adjacency message 401-1 sent from router R11 to router R12 via the transport layer connection 301 and, similarly, R11 can verify the identity and authentication of router R12 based on an adjacency message 401-2 received from router R12 via the transport layer connection 301).

Figure 5:
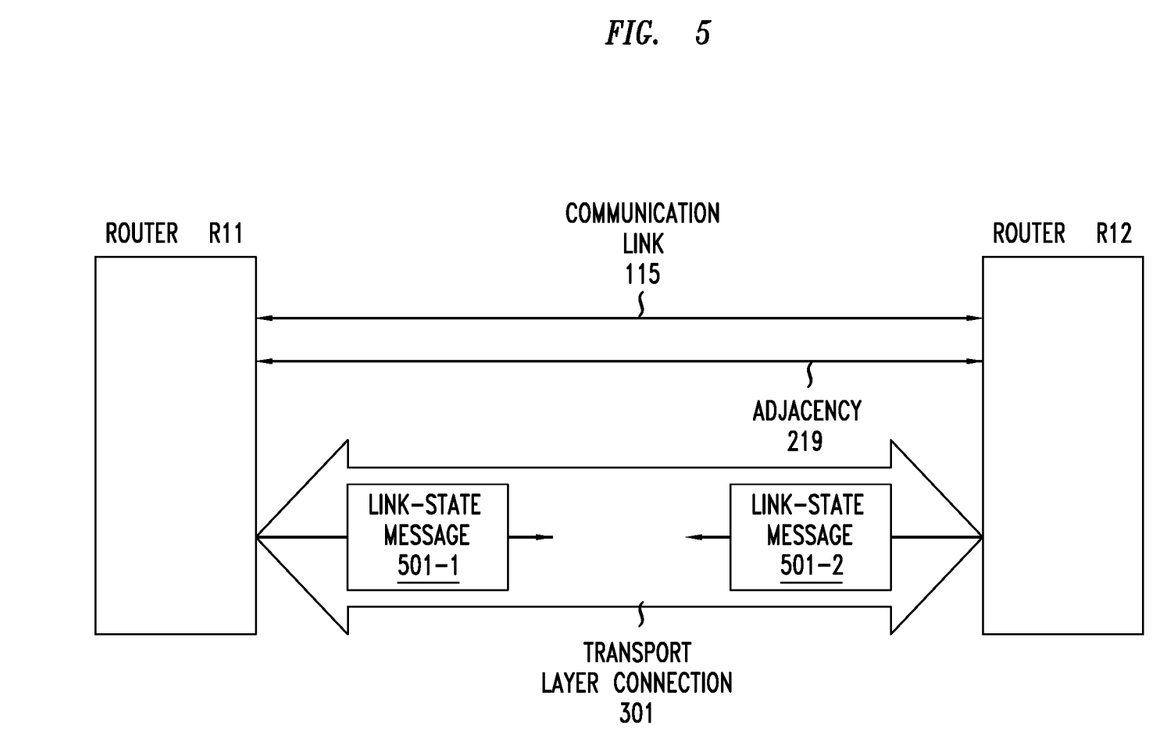
FIG. 5 depicts the pair of routers of FIG. 4, in which the routers use the transport layer connection to support communication of link-state messages between the routers.

FIG. 5 depicts the pair of routers of FIG. 4, in which the routers use the transport layer connection to support communication of link-state messages between the routers.

The routers R11 and R12 are configured to support communication of link-state messages 501 of the routing protocol via the transport layer connection 301 between router R11 and router R12 (illustratively, link-state message 501-1 sent from router R11 toward router R12 and link-state message 501-2 sent from router R12 toward router R11). The link-state messages may include link state information. For example, the link-state messages 501 may be IS-IS LSPs including link-state information, OSPF LSAs including link-state information, or the like. The exchanging of link-state messages 501 over the transport layer connection 301 may be performed in various ways, which may vary for different routing protocols.

In at least some embodiments, in which the routing protocol is IS-IS and the transport layer protocol is TCP, the exchanging of link-state messages 501 over the TCP connection may be performed as follows. The router R11 and the router R12 may begin by each exchanging complete sequence number PDUs (CSNPs), with the most recent LSPs, via the TCP connection. The router R11 and the router R12 each compare the received LSPs with the LSPs on the receiving router (e.g., router R11 compares the LSPs that are already on router R11 with the LSPs received from router R12 and, similarly, router R12 compares the LSPs that are already on router R12 with the LSPs received from router R11). The router R11 and the router R12 each send their more recent LSPs to each other via the TCP connection. It is noted that use of TCP in this manner increases speed and reliability, takes care of reliability and pacing, and so forth, as well as various combinations thereof. The processing that is performed by each of the routers R11 and R12 upon receiving a new LSP (e.g., when an adjacency exists between routers R11 and R12) may include various types of processing, which may vary for different routing protocols.

In at least some embodiments, in which the routing protocol is IS-IS and the transport layer protocol is TCP, the processing that is performed by a router upon receiving an LSP over the TCP connection may be performed as follows. The router determines whether the received LSP is already included in the LSDB of the receiving router. If the received LSP is not already included in the LSDB of the receiving router, the receiving router adds the LSP to its database. If the received LSP is already included in the LSDB of the receiving router, the receiving router determines whether the version of the received LSP is older or newer than the version of the existing LSP of the LSDB. The receiving router, based on a determination that the version of the received LSP and the version of the existing LSP of the LSDB are the same, does nothing. The receiving router, based on a determination that the version of the received LSP is older than version of the existing LSP of the LSDB, sends its own LSP back to the router from which it received the received LSP. The receiving router, based on a determination that the version of the received LSP is newer than version of the existing LSP of the LSDB, the receiving router will send the LSP to adjacent routers (potentially via other TCP connections) except for the router from which it received the received LSP.

In at least some embodiments, in which the routing protocol is IS-IS and the transport layer protocol is TCP, the processing that is performed by a router for flooding LSP via TCP may be performed as follows. The router may check its LSDB for LSPs that are programmed for flooding and, upon identifying such LSPs, may flood those LSPs to neighboring routers via TCP connections with the neighboring routers. The router may perform the check for LSPs that are programmed for flooding periodically, in response to various types of events, or the like, as well as various combinations thereof.

It will be appreciated that at least some such embodiments for supporting flooding of IS-IS LSPs via TCP may have various benefits. For example, the sending router, after sending one or more LSPs via the TCP connection (since TCP supports flow control and retransmissions at the transport protocol layer), does not need to set any state in the routing protocol for tracking the need to retransmit the one or more LSPs, does not expect an acknowledgment (e.g., PSNP) in the routing protocol from the receiving router, and does not need to start a retransmission time. Similarly, for example, the receiving router, after receiving one or more LSPs via the TCP connection (again, since TCP supports flow control and retransmissions at the transport layer protocol), does not need to set any state in the routing protocol related to successful receipt of the one or more LSPs (e.g., does not need to set the SSN-bit) and does not need to send an acknowledgment (e.g., PSNP) in the routing protocol to the sending router. In other words, just sending the LSPs is enough, as there is no packet-pacing, the flow control is handled by TCP, and so forth.

It will be appreciated that, although primarily presented above with respect to example embodiments in which the routing protocol is IS-IS, various example embodiments for supporting link-state flooding based on use of a transport layer protocol may be configured to support use of a transport layer protocol to support link-state flooding for various other types of routing protocols (e.g., OSPF version 2 (OSPFv2), OSPF version 3 (OSPFv3), or the like). It will be appreciated that various IS-IS-specific embodiments discussed above may be used, or adapted for use, to support use of a transport layer protocol to support link-state flooding for various other types of routing protocols.

It will be appreciated that, although primarily presented above with respect to example embodiments in which the transport layer protocol is TCP, various example embodiments for supporting link-state flooding for a routing protocol may be configured to support link-state flooding for the routing protocol based on various other types of transport layer protocols (e.g., Multipath TCP, SCTP, or the like). It will be appreciated that various TCP-specific embodiments discussed above may be used, or adapted for use, to support link-state flooding for a routing protocol based on use of various other types of transport layer protocols.

Figure 6:
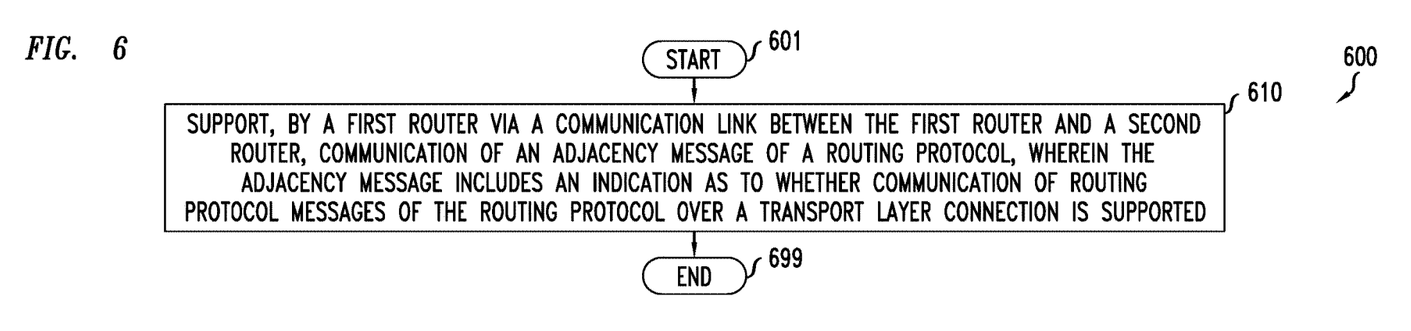
FIG. 6 depicts an example embodiment of a method for use by a router to establish an adjacency with a neighboring router in a manner for learning whether the neighboring router is configured to support use of a transport layer connection for exchanging of routing protocol messages.

FIG. 6 depicts an example embodiment of a method for use by a router to establish an adjacency with a neighboring router in a manner for learning whether the neighboring router is configured to support use of a transport layer connection for exchanging of routing protocol messages. It will be appreciated that, although primarily presented as being performed serially, at least a portion of the functions of method 600 may be performed contemporaneously or in a different order than as presented with respect to FIG. 6. At block 601, method 600 begins. At block 610, support, by a first router via a communication link between the first router and a second router, communication of an adjacency message of a routing protocol, wherein the adjacency message includes an indication as to whether communication of routing protocol messages of the routing protocol over a transport layer connection is supported. At block 699, method 600 ends.

Figure 7:
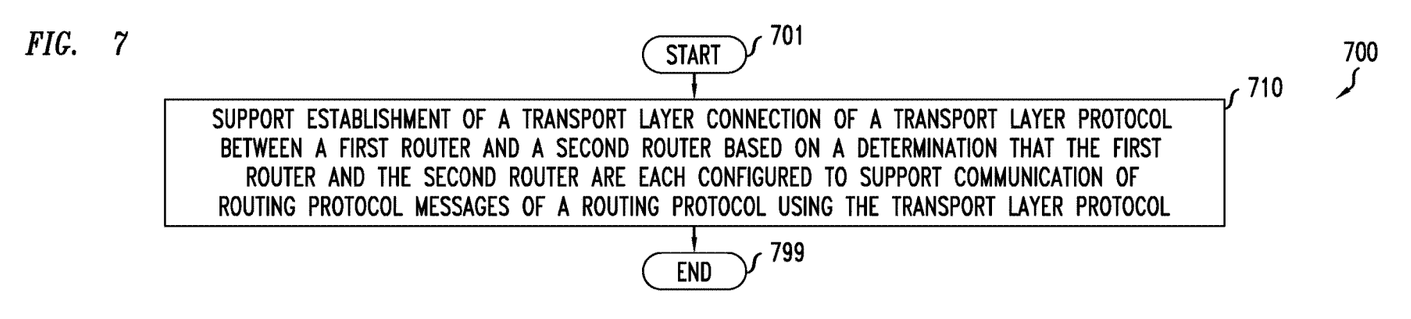
FIG. 7 depicts an example embodiment of a method for use by a router to establish a transport layer connection with an adjacent router for use in supporting communication of routing protocol messages between the routers using the transport layer connection.

FIG. 7 depicts an example embodiment of a method for use by a router to establish a transport layer connection with an adjacent router for use in supporting communication of routing protocol messages between the routers using the transport layer connection. It will be appreciated that, although primarily presented as being performed serially, at least a portion of the functions of method 700 may be performed contemporaneously or in a different order than as presented with respect to FIG. 7. At block 701, method 700 begins. At block 710, support establishment of a transport layer connection of a transport layer protocol between a first router and a second router based on a determination that the first router and the second router are each configured to support communication of routing protocol messages of a routing protocol using the transport layer protocol. At block 799, method 700 ends.

Figure 8:
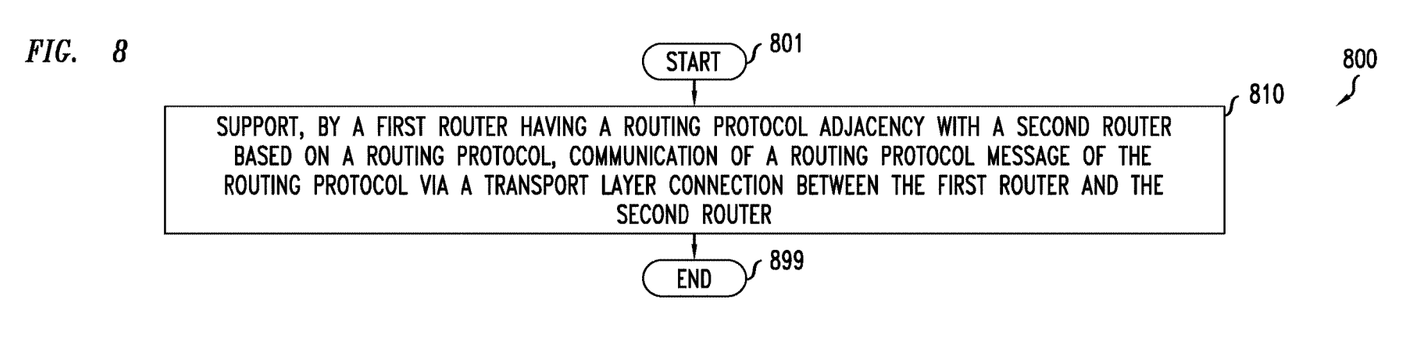
FIG. 8 depicts an example embodiment of a method for use by a router to support communication of a routing protocol message of a routing protocol with an adjacent router using a transport layer connection between the routers.

FIG. 8 depicts an example embodiment of a method for use by a router to support communication of a routing protocol message of a routing protocol with an adjacent router using a transport layer connection between the routers. It will be appreciated that, although primarily presented as being performed serially, at least a portion of the functions of method 800 may be performed contemporaneously or in a different order than as presented with respect to FIG. 8. At block 801, method 800 begins. At block 810, support, by a first router having a routing protocol adjacency with a second router based on a routing protocol, communication of a routing protocol message of the routing protocol via a transport layer connection between the first router and the second router. At block 899, method 800 ends.

Various example embodiments for supporting link-state flooding of a routing protocol using a transport layer protocol may provide various advantages or potential advantages. For example, various example embodiments for supporting link-state flooding of a routing protocol using a transport layer protocol may obviate the need for the routing protocol to support various reliability features (e.g., acknowledgement, retransmissions, windowing, multi-threading, or the like, as well as various combinations thereof), as such reliability features instead may be provided by the transport layer protocol such that the routing protocol is no longer burdened by providing such features. For example, various example embodiments for supporting use of TCP for IS-IS flooding may remove the ISO-10589 LSP Flooding scale limitations (e.g., packet pacing of LSPs, reliable flooding on point-to-point interfaces, unreliability of CSNPs, and so forth), may enable classic IGP (e.g., having 1000s routers) to scale to BGP-size route networks (e.g., having 100,000s of routers), and so forth. Various example embodiments for supporting link-state flooding of a routing protocol using a transport layer connection may provide various other advantages or potential advantages.

It will be appreciated that, although primarily presented herein with respect to use of various embodiments for supporting flooding of link-state information, at least some of the embodiments presented herein may be used for or adapted for use for flooding other types of information (e.g., other types of state information, control information, or the like, as well as various combinations thereof).

Figure 9:
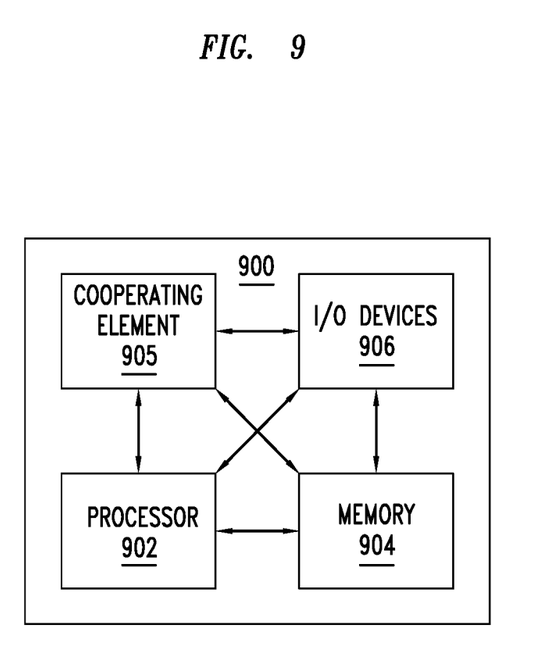
FIG. 9 depicts a high-level block diagram of a computer suitable for use in performing various functions presented herein.

FIG. 9 depicts a high-level block diagram of a computer suitable for use in performing various functions described herein.

The computer 900 includes a processor 902 (e.g., a central processing unit (CPU), a processor having a set of processor cores, a processor core of a processor, or the like) and a memory 904 (e.g., a random access memory (RAM), a read only memory (ROM), or the like). The processor 902 and the memory 904 may be communicatively connected.

The computer 900 also may include a cooperating element 905. The cooperating element 905 may be a hardware device. The cooperating element 905 may be a process that can be loaded into the memory 904 and executed by the processor 902 to implement functions as discussed herein (in which case, for example, the cooperating element 905 (including associated data structures) can be stored on a non-transitory computer-readable storage medium, such as a storage device or other storage element (e.g., a magnetic drive, an optical drive, or the like)).

The computer 900 also may include one or more input/output devices 906. The input/output devices 906 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 900 may represent a general architecture and functionality suitable for implementing functional elements described herein, portions of functional elements described herein, or the like, as well as various combinations thereof. For example, computer 900 may provide a general architecture and functionality that is suitable for implementing one or more elements presented herein, such as a router 112 or a portion thereof, a link-state flooding control element 114 or a portion thereof, or the like, as well as various combinations thereof.

It will be appreciated that at least some of the functions presented herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits (ASIC), and/or any other hardware equivalents).

It will be appreciated that at least some of the functions presented herein may be implemented within hardware, for example, as circuitry that cooperates with the processor to perform various functions. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer-readable media), transmitted via a data stream in a broadcast or other signal bearing medium, and/or stored within a memory within a computing device operating according to the instructions.

It will be appreciated that the term "or" as used herein refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
   at least one processor; and
   at least one memory including computer program code;
   wherein the at least one memory and the computer program code are configured to, with the at least one processor, cause the apparatus to at least:
   support, between a first router and a second router based on an intermediate-system-to-intermediate system protocol, exchanging of messages including a first intermediate-system-to-intermediate-system adjacency message indicative as to whether the first router supports communication of link state messages of the intermediate-system-to-intermediate system protocol using a transport layer protocol and a second intermediate-system-to-intermediate-system adjacency message indicative as to whether the second router supports communication of link state messages of the intermediate-system-to-intermediate-system protocol using the transport layer protocol, wherein the first intermediate-system-to-intermediate-system adjacency message includes transport layer connection establishment information configured for use in establishing a transport layer connection between the first router and the second router, wherein the transport layer connection establishment information includes an Internet Protocol (IP) address of the first router and a port number of a port of the first router on which the transport layer connection is to be established; and support, by the first router based on a determination that the first router and the second router support communication of link state messages of the intermediate-system-to-intermediate-system protocol using the transport layer protocol, establishment of the transport layer connection between the first router and the second router.

2. The apparatus of claim 1, wherein, to support the exchanging of the messages, the at least one memory and the computer program code are configured to, with the at least one processor, cause the apparatus to at least:

send, by the first router toward the second router, the first intermediate-system-to-intermediate-system adjacency message.

3. The apparatus of claim 1, wherein the first intermediate-system-to-intermediate-system adjacency message includes a type-length-value (TLV) indicative that the first router supports communication of link state messages of the intermediate-system-to-intermediate-system protocol using the transport layer protocol.

4. The apparatus of claim 1, wherein the transport layer protocol includes one of a Transmission Control Protocol (TCP), a Multipath TCP, or a Stream Control Transmission Protocol (SCTP).

5. An apparatus, comprising:

at least one processor; and at least one memory including computer program code;

wherein the at least one memory and the computer program code are configured to, with the at least one processor, cause the apparatus to at least:

support, between a first router and a second router based on an intermediate-system-to-intermediate system protocol, exchanging of messages including a first intermediate-system-to-intermediate-system adjacency message indicative as to whether the first router supports communication of link state messages of the intermediate-system-to-intermediate system protocol using a transport layer protocol and a second intermediate-system-to-intermediate-system adjacency message indicative as to whether the second router supports communication of link state messages of the intermediate-system-to-intermediate-system protocol using the transport layer protocol, wherein the second intermediate-system-to-intermediate-system adjacency message includes transport layer connection establishment information configured for use in establishing a transport layer connection between the first router and the second router, wherein the transport layer connection establishment information includes an Internet Protocol (IP) address of the second router and a port number of a port of the second router on which the transport layer connection is to be established; and support, by the first router based on a determination that the first router and the second router support communication of link state messages of the intermediate-system-to-intermediate-system protocol using the transport layer protocol, establishment of the transport layer connection between the first router and the second router.

6. The apparatus of claim 5, wherein, to support the exchanging of the messages, the at least one memory and the computer program code are configured to, with the at least one processor, cause the apparatus to at least:

receive, by the first router from the second router, the second intermediate-system-to-intermediate-system adjacency message.

7. The apparatus of claim 5, wherein the second intermediate-system-to-intermediate-system adjacency message includes a type-length-value (TLV) indicative that the second router supports communication of link state messages of the intermediate-system-to-intermediate-system protocol using the transport layer protocol.

8. The apparatus of claim 5, wherein the transport layer protocol includes one of a Transmission Control Protocol (TCP), a Multipath TCP, or a Stream Control Transmission Protocol (SCTP).

9. An apparatus, comprising:

at least one processor; and at least one memory including computer program code;

wherein the at least one memory and the computer program code are configured to, with the at least one processor, cause the apparatus to at least:

send, by a first router, an adjacency message of an intermediate-system-to-intermediate-system protocol, wherein the adjacency message includes a type-length-value indicative of a request to support communication of link state messages of the intermediate-system-to-intermediate-system protocol over a transport layer connection between the first router and a second router, wherein the type-length-value includes transport layer connection establishment information configured for use in establishing the transport layer connection between the first router and the second router, wherein the transport layer connection establishment information includes a transport layer protocol port number of a port of the first router;

support, by the first router based on the transport layer connection establishment information, establishment of the transport layer connection between the first router and the second router; and support, by the first router based on the transport layer connection between the first router and the second router, communication of a routing protocol message of the intermediate-system-to-intermediate-system protocol.

10. The apparatus of claim 9, wherein the routing protocol message includes a router adjacency message.

11. The apparatus of claim 10, wherein the router adjacency message is configured for enabling verification and authentication between the first router and the second router.

12. The apparatus of claim 9, wherein the routing protocol message includes a link-state message configured to enable flooding of link-state information.

13. The apparatus of claim 12, wherein the link-state message comprises a complete sequence number protocol data unit for a set of link state protocol data units.

14. The apparatus of claim 9, wherein the type-length-value includes a sub-type-length-value including the transport layer connection establishment information.

15. The apparatus of claim 9, wherein the transport layer connection is based on one of a Transmission Control Protocol (TCP), a Multipath TCP, or a Stream Control Transmission Protocol (SCTP).

16. A method, comprising:
  sending, by a first router, an adjacency message of an intermediate-system-to-intermediate-system protocol, wherein the adjacency message includes a type-length-value indicative of a request to support communication of link state messages of the intermediate-system-to-intermediate-system protocol over a transport layer connection between the first router and a second router, wherein the type-length-value includes transport layer connection establishment information configured for use in establishing the transport layer connection between the first router and the second router, wherein the transport layer connection establishment information includes a transport layer protocol port number of a port of the first router;
  supporting, by the first router based on the transport layer connection establishment information, establishment of the transport layer connection between the first router and the second router; and
  supporting, by the first router based on the transport layer connection between the first router and the second router, communication of a routing protocol message of the intermediate-system-to-intermediate-system protocol.

* * * * *